Figure 1:
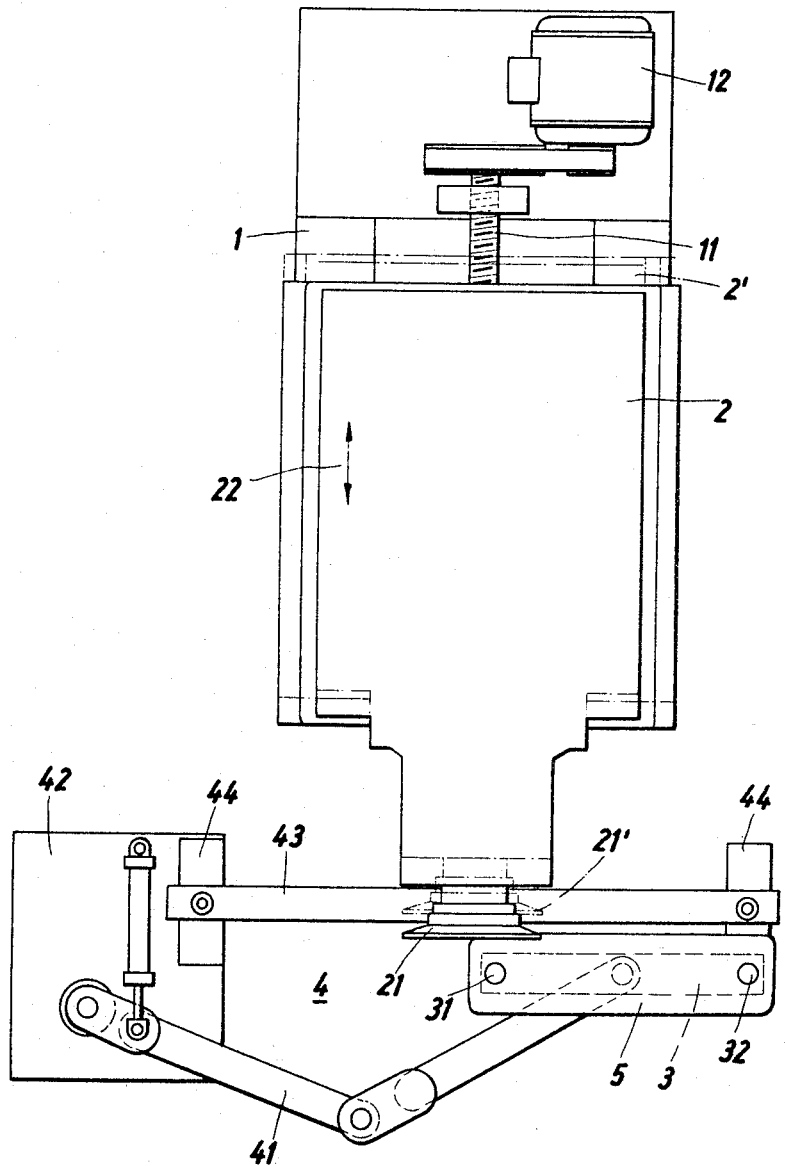

Sept. 27, 1966      E. HIRSIGER      3,275,792

SEAM WELDING MACHINE

Filed Feb. 10, 1964      2 Sheets-Sheet 1

United States Patent Office 3,275,792
Patented Sept. 27, 1966

3,275,792
SEAM WELDING MACHINE
Eugen Hirsiger, Zurich, Switzerland, assignor to H. A. Schlatter AG, Zollikon, Zurich, Switzerland
Filed Feb. 10, 1964, Ser. No. 343,777
Claims priority, application Switzerland, Mar. 2, 1963, 2,695/63
5 Claims. (Cl. 219—82)

The invention relates to a seam welding machine having a work-holder which, by means of a guide system, is movable along a predetermined path of the seam it is required to weld.

Machines of this kind are suitable, for example, for welding a seam at the peripheries of radiator elements consisting of two sheet steel halves.

In machines for this purpose the work-holder has two pins over which the flow-apertures of the halves are fitted.

Another example of the use of such machines is for the manufacture of fuel tanks from two pressed halves, by welding together the edges thereof. In machines of this kind, the work-holder has a chucking or like system to retain the two halves in their predetermined positions in relation to one another.

The guide system is used so to guide the work-holder that the electrode rollers run along the weld seam it is required to make, for example along the edges of the halves.

A known guide system has an endless chain which extends along the path of the weld seam it is required to make and which is rigidly connected to the work-holder. The feed is produced by a sprocket wheel engaging in the chain, and the electrode rollers are trailing rollers.

In another known guide system, the work-holder is movable on a multi-link lever and is guided by pins and guide slots. The electrode rollers are driven rollers and exert a feeding force on the workpiece, such force moving the work-holder along the guide path.

These guide systems are positive systems so that the work-holder can assume only those positions in which those parts of the workpiece which are to be welded together, for example the edges of the halves, are situated between the electrode rollers.

This makes loading and unloading of the workholder very difficult. For example, to enable the two halves of a radiator element to be fitted on to the work-holder pins, or to enable the halves to be removed from the holder after welding together, the top electrode roller must be lifted by an amount greater than the thickness of the radiator element. In no case is it possible for the workpieces simply to be placed vertically on the work-holder before welding, and to be removed in the same way therefrom after welding. The considerable travel required for the top electrode roller and the complicated movement during loading and unloading of the workholder are undesirable as regards construction; they make the machines more expensive and more liable to trouble, and increase the working time. In particular, automatic loading and unloading are made very difficult as a result.

An object of the invention is to obviate these disadvantages and provide a seam welding machine requiring only a small electrode roller travel and wherein the workholder can be loaded and unloaded simply by vertical insertion and removal of the work-pieces.

According to the invention, a part of the machine associated with the guide system and a part of the machine associated with the electrode rollers are movable in relation to one another between an operative position in which the work-holder is movable over the predetermined path with respect to the electrode rollers, and a loading and unloading position in which the work-holder is offset from said path in a direction pointing away from the electrode rollers, and the said parts are lockable in at least one of these positions.

Figure 2:
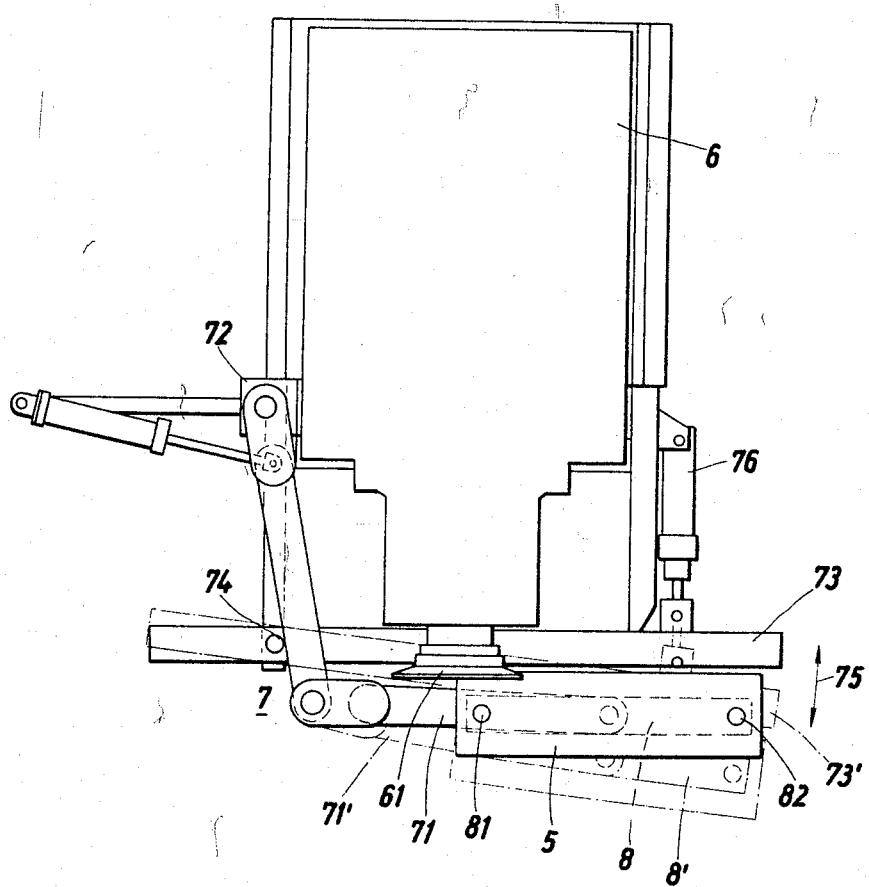

The invention is illustrated, by way of example, in the accompanying drawing, wherein:

FIG. 1 is a diagrammatic plan view showing a seam welding machine according to the invention, for welding together the halves of radiator elements, only those parts necessary for understanding the invention having been shown; and FIG. 2 is a view similar to FIG. 1, of a second embodiment of the machine.

In FIG. 1, reference numeral 1 denotes a base on which a carriage 2 is slidable; reference numeral 3 denotes a work-holder and 4 its guide system.

Electrode rollers, and other parts (not shown) not associated with the guide system 4 are disposed on the carriage 2. Only the top one 21 of the electrode rollers is shown in the drawings.

A screw spindle 11, which can be driven by a reversible electric motor 12 mounted on the base 1, is used to move the carriage 2. When the motor 12 is switched off, the carriage 2 is locked in position as a result of the self-locking action of the spindle 11.

The directions of movement of the carriage 2 are indicated in the drawing by a double arrow 22, and the carriage 2 and the electrode roller 21 are shown in solid lines in their operative positions and in chain-dotted lines in a second position 2', 21'.

The work-holder 3 has two pins 31, 32 onto which the radiator element halves which it is required to weld together are fitted. The drawing shows only the top one 5 of these halves. The work-holder 3 is borne by a multi-link arm 41. One end of the articulated arm 41 is pivotally mounted on a fixed base 42 while the other end is pivotally connected to the work-holder 3. The guide system includes a straight edge 43 whose ends are secured to fixed bases 44, and other guide means not shown in detail (for example a slotted guide body and guide pins).

The guide system 4 limits the movability of the work-holder 3 to all those positions in which the edge of the half 5 and the edge of the bottom half (not shown) situated therebeneath are located between the mutually opposite zones of the peripheries of the top electrode roller 21 and of the bottom electrode roller situated therebeneath, when the electrode rollers are in their operative position. It will be apparent that the top half 5 and the bottom half are situated outside the zone of the electrode rollers when the carriage 2 and hence the top electrode roller 21 (and the bottom electrode roller) have been moved into the position indicated at 2' and 21' respectively. In these positions of the carriage and rollers the halves to be welded can be fitted from above onto the pins 31, 32 and after welding the halves can be lifted off the pins 31, 32 without the loading and unloading operations being in any way obstructed by the electrode rollers and without it being necessary for the top electrode roller 21 to be lifted to form a free space above the workpiece.

The machine according to FIG. 2 differs from that described in connection with FIG. 1 mainly in that the machine part associated with the electrode rollers is fixed and the guide system is pivotable with respect to such part.

The machine shown in FIG. 2 has a fixed machine frame 6 having bearings for the electrode rollers and other parts not associated with the guide system which is here indicated by the reference numeral 7. The top electrode roller is denoted by reference numeral 61. The bottom electrode roller is not shown. A work-holder 8 with pins 81, 82 and the guide system 7 with an articulated arm 71, a bracket 72 and a straight edge 73 correspond to the work-holder 3 with the pins 31, 32 and the guide system 4 with the articulated arm 41, the base 42 and the straight edge 43 of the machine according to FIG. 1.

Unlike the machine shown in FIG. 1, however, the articulated arm 71 in FIG. 2 is borne by the bracket 72 which is secured to the machine frame 6, and the straight edge 73 is pivotable at one end in the direction of the double arrow 75 about a pivot 74 disposed on the machine frame 6. A ram 76 is used to provide the pivoting movement, the cylinder of the ram being pivotably secured to the machine frame 6 while the piston rod thereof is articulated on the other end of the straight edge 73. The guide system 7 together with the work-holder 8 can thus be optionally brought either into the solid-like operative position 7, 71, 73, 8 or into a second chain-dotted position 71', 73', 8' which, as described in connection with FIG. 1, provides for loading and unloading of the work-holder.

The piston of the ram 76 may be doubleacting or be subject to the action of a return spring. The guide system 7 is locked both in the operative position (i.e. the full line position) and in the second position (i.e. the chain-dotted position) by the cylinder feed or return chamber of the ram being kept under pressure, or the cylinder working chamber being kept under pressure or relieved of pressure, in which latter case the return spring is operative.

What is claimed is:
1. A seam welding machine comprising:
 a work holder;
 guide means for guiding said work holder along a first predetermined path corresponding to the seam to be welded;
 two electrode rollers having parallel axes;
 a structure supporting said electrode rollers; and
 mounting means mounting said guide means with said work holder and said electrode rollers with said supporting structure to be movable relative to each other along a second path parallel to the axes of said electrode rollers between an operative position in which the electrode rollers engage a workpiece on the work holder and a loading or unloading position in which said work holder and said electrode rollers are withdrawn from each other.

2. The machine of claim 1 wherein said guide means and said work holder are stationary and said electrode rollers and said supporting structure are displaceable with respect to said guide means and said work holder.

3. The machine of claim 1 wherein said electrode rollers and said supporting structure are stationary and said guide means and said work holder are displaceable with respect to said electrode rollers and said supporting structure.

4. The machine of claim 2 wherein said machine has a stationary base, said supporting structure comprises a slidable carriage mounted on said base and means are connected to said carriage for sliding said carriage along said base to move said electrode rollers between the operative position and the loading or unloading position.

5. The machine of claim 3 wherein said machine has a frame, said work holder is pivotally mounted on said frame; and means are connected to said work holder for pivoting said work holder between the operative position and the loading or unloading position.

References Cited by the Examiner

UNITED STATES PATENTS

| 2,787,700 | 4/1957 | Kalbow | 219—79 X |
| 2,908,802 | 10/1959 | Watter et al. | 219—81 |
| 2,975,263 | 3/1961 | Green et al. | 219—83 |
| 3,092,712 | 6/1963 | Peras | 219—81 |

FOREIGN PATENTS 710,539   6/1954   Great Britain.

OTHER REFERENCES

"Resistance Welding at Work," Sciaky Bros. Inc., January 1948, vol. 2, No. 4.

RICHARD M. WOOD, *Primary Examiner.*

ANTHONY BARTIS, *Examiner.*

B. A. STEIN, *Assistant Examiner.*